United States Patent [19]

Green

[11] Patent Number: 5,449,699

[45] Date of Patent: Sep. 12, 1995

[54] RIGID CLOSED CELL POLYISOCYANATE BASED FOAMS FOR USE AS POSITIVE FLOTATION MATERIALS IN WATERCRAFT

[75] Inventor: Todd J. Green, Canton, Mich.

[73] Assignee: BASF Corporation, Mt. Olive, N.J.

[21] Appl. No.: 383,627

[22] Filed: Feb. 6, 1995

Related U.S. Application Data

[62] Division of Ser. No. 273,447, Jul. 8, 1994, Pat. No. 5,409,961.

[51] Int. Cl.$^6$ .................. C08J 9/14; C08G 18/18
[52] U.S. Cl. .................. 521/131; 252/182.24; 252/182.26
[58] Field of Search .................. 521/131; 252/182.24, 252/182.26

[56] References Cited

U.S. PATENT DOCUMENTS

| | | |
|---|---|---|
| 3,541,023 | 11/1970 | Cole . |
| 3,769,232 | 10/1973 | Houldridge . |
| 4,972,003 | 11/1990 | Grünbauer et al. .................. 521/131 |
| 4,997,706 | 3/1991 | Smits et al. . |
| 5,032,623 | 7/1991 | Keske et al. . |
| 5,264,464 | 11/1993 | Wishneski et al. . |
| 5,328,938 | 7/1994 | Wishneski et al. . |
| 5,409,961 | 4/1995 | Green .................. 521/78 |

OTHER PUBLICATIONS

U.S. Serial No. 08/272,401 to Tucker et al.

*Primary Examiner*—Morton Foelak
*Attorney, Agent, or Firm*—Dennis V. Carmen

[57] ABSTRACT

There is now provided a rigid closed cell polyisocyanate based foam for use as a positive flotation material for watercraft which meets the U.S. Coast Guard immersion test (CGD 75-168, 33 C.F.R. §183.114). As a blowing agent for this foam, a mixture of 1,1,1,2-tetrafluoroethane (R-134a) as a frothing agent and water is used, where the amount of water is less than 2.5 weight percent based on the weight of the formulated polyol composition. Also, in preferable embodiments, the polyols in the polyol composition are initiated by at least one amine; and the polyol composition contains a delayed action tertiary amine catalyst. The foams used in the invention have excellent dimensional stability. In another embodiment, there is also provided a formulated polyol composition of R-134a and a polyol composition having an average OH# of less than 400 and an average functionality of greater than 4 using R-134a and less than 2.5 wt. % of water, where the isocyanate and the formulated polyol composition are reacted in a weight ratio of 0.9:1 to 1.3:1, to provide a dimensionally stable foam for use as a flotation foam in watercraft.

5 Claims, No Drawings

RIGID CLOSED CELL POLYISOCYANATE BASED FOAMS FOR USE AS POSITIVE FLOTATION MATERIALS IN WATERCRAFT

This is a division of application Ser. No. 08/273,447 filed Jul. 8, 1994, now U.S. Pat. No. 5,409,961.

FIELD OF THE INVENTION

The present invention relates to a method of using a closed cell rigid polyisocyanate based foam, in particular to a method of using 1,1,1,2-tetrafluoroethane/water co-blowing rigid closed cell polyisocyanate based foam as a positive flotation system in watercraft which passes U.S. Coast Guard standard CGD 75-168, Rule §183.144.

BACKGROUND OF THE INVENTION

U.S. Pat. No. 4,997,706 describes the use of 1,1,1,2-tetrafluoroethane (R-134a) as a blowing agent which has a zero ozone depletion potential for closed cell rigid polarethane foams in refrigeration applications where low thermal insulation K-factors are desirable. In other applications, however, where other foam properties such as buoyancy and dimensional stability are of paramount importance, a foam having good insulation properties may not satisfy these other requirements.

It would be desirable to manufacture a closed cell rigid polarethane foam for use as a positive flotation device in watercraft. For this use, the foam must satisfy the U.S. Coast Guard requirements under 33 C.F.R.§183.114, which specifies that the flotation material must not lose more than five percent of its buoyant force as measured by ASTM D-2842 after being immersed for a specified amount of time in various media, such as gasoline vapor, gasoline, oil, and a five percent solution of trisodium phosphate in water. Under such rigorous conditions, the foam must be very dimensionally stable so as not to change its volume and must repel the media into which it is immersed to prevent picking up additional weight.

SUMMARY OF THE INVENTION

I have discovered a particular rigid closed cell polyisocyanate based foam for use as a positive flotation material for watercraft which meets the U.S. Coast Guard immersion test (CGD 75-168, 33 C.F.R. §183.114). As a blowing agent for this foam, a mixture of 1,1,1,2-tetrafluoroethane (R-134a) as a frothing agent and water is used, where the amount of water is less than 2.5 weight percent based on the weight of the formulated polyol composition. Also, in preferable embodiments, the polyols in the polyol composition are initiated by at least one amine; and the polyol composition contains a delayed action tertiary amine catalyst. The foams used in the invention have excellent dimensional stability. In another embodiment, there is also provided a formulated polyol composition of R-134a and a polyol composition having an average OH# of less than 400 and an average functionality of greater than 4 using R-134a and less than 2.5 wt. % of water, where the isocyanate and the formulated polyol composition are reacted in a weight ratio of 0.9:1 to 1.3:1, to provide a dimensionally stable foam for use as a flotation foam in watercraft.

DETAILED DESCRIPTION OF THE INVENTION

The foams used as marine flotation devices are rigid and closed cell. By a rigid foam is meant a foam having a high ratio of compressive strength to tensile strength of 0.5:1 or greater and an elongation of 10 percent or less. By a closed cell foam is meant a foam having at least 85 percent closed cells and preferably 90 percent or more closed cells. The foams are polyisocyanate based meaning that they are made by reacting the reactive ingredients in a polyol composition with an organic isocyanate. In preferred embodiments, all of the R-134a used as a frothing agent is added to the polyol composition to form a formulated polyol composition.

The polyol composition comprises a polyoxyalkylene polyether polyol, water as a coblowing agent, a polyurethane linkage promoting catalyst, a surfactant, and optionally fillers, flame retardants, stabilizers, fungicides, and bacteriostats.

Turning to the ingredients in the polyol composition, there is provided a polyol having at least two isocyanate reactive hydrogens, which are defined herein as having number average molecular weights of greater than 400. The compounds having at least two isocyanate active hydrogens have an average hydroxyl number ranging from 150 to 800 mgKOH/g of compound having at least two isocyanate active hydrogens. In a preferred embodiment, however, the average hydroxyl number is less than 400 and the average functionality is greater than 4.0., and more preferably, the average hydroxyl number is 350 or less and the average functionality is 4.5 or more. These average hydroxyl numbers are unusual in that the typical rigid polyurethane foam is made with polyols whose average hydroxyl number exceeds 400 so as to provide the rigidity and structural strength necessary to make a dimensionally stable foam. However, in the present invention, a dimensionally stable foam is provided with a polyol combination that has a low average hydroxyl number. Further, by providing a low average hydroxyl number, the flow characteristics of the froth foaming mixture are enhanced, and less isocyanate is consumed at any given isocyanate index. It is to be understood that compounds having at least two isocyanate active hydrogens whose hydroxyl numbers exceed 400 can be employed so long as the average hydroxyl number of all such compounds is less than 400.

Examples include polythioether polyols, polyester amides and polyacetals containing hydroxyl groups, aliphatic polycarbonates containing hydroxyl groups, amine terminated polyoxyalkylene polyethers, and preferably, polyester polyols, polyoxyalkylene polyether polyols, and graft dispersion polyols. In addition, mixtures of at least two of the aforesaid polyols can be used as long as the combination has an average hydroxyl number in the aforesaid range.

The term "polyester polyol" as used in this specification and claims includes any minor amounts of unreacted polyol remaining after the preparation of the polyester polyol and/or unesterified polyol (e.g., glycol) added after the preparation of the polyester polyol. The polyester polyol can include up to about 40 weight percent free glycol.

Suitable polyester polyols can be produced, for example, from organic dicarboxylic acids with 2 to 12 carbons, preferably aliphatic dicarboxylic acids with 4 to 6 carbons, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids can be used individually or in mixtures. Instead of the free dicarboxylic acids, the corresponding dicarboxylic acid derivatives may also be used such as dicarboxylic acid mono- or di- esters of alcohols with 1 to 4 carbons, or dicarboxylic acid anhydrides. Dicarboxylic acid mixtures of succinic acid, glutaric acid and adipic acid in quantity ratios of 20–35:-35–50:20–32 parts by weight are preferred, especially adipic acid. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol, and 1,6-hexanediol. Furthermore, polyester polyols of lactones, e.g., ε-caprolactone or hydroxycarboxylic acids, e.g., ω-hydroxycaproic acid, may also be used.

The polyester polyols can be produced by polycondensation of organic polycarboxylic acids, e.g., aromatic or preferably aliphatic polycarboxylic acids and-/or derivatives thereof and multivalent alcohols in the absence of catalysts or preferably in the presence of esterification catalysts, preferably in an atmosphere of inert gases, e.g., nitrogen, carbon dioxide, helium, argon, etc., in the melt at temperatures of 150° to 250° C., preferably 180° to 220° C., optionally under reduced pressure, up to the desired acid value which is preferably less than 10, especially less than 2. In a preferred embodiment, the esterification mixture is subjected to polycondensation at the temperatures mentioned above up to an acid value of 80 to 30, preferably 40 to 30, under normal pressure, and then under a pressure of less than 500 mbar, preferably 50 to 150 mbar. The reaction can be carried out as a batch process or continuously. When present, excess glycol can be distilled from the reaction mixture during and/or after the reaction, such as in the preparation of low free glycol-containing polyester polyols usable in the present invention. Examples of suitable esterification catalysts include iron, cadmium, cobalt, lead, zinc, antimony, magnesium, titanium and tin catalysts in the form of metals, metal oxides or metal salts. However, the polycondensation may also be preformed in liquid phase in the presence of diluents and/or chlorobenzene for aziotropic distillation of the water of condensation.

To produce the polyester polyols, the organic polycarboxylic acids and/or derivatives thereof and multivalent alcohols are preferably polycondensed in a mole ratio of 1:1–1.8, more preferably 1:1.05–1.2.

After transesterification or esterification, the reaction product can be reacted with an alkylene oxide to form a polyester polyol mixture. This reaction desirably is catalyzed. The temperature of this process should be from about 80° to 170° C., and the pressure should generally range from about 1 to 40 atmospheres.

While the aromatic polyester polyols can be prepared from substantially pure reactant materials, more complex ingredients can be used, such as the side stream, waste or scrap residues from the manufacture of phthalic acid, terephthalic acid, dimethyl terephthalate, polyethylene terephthalate, and the like. Compositions containing phthalic acid residues for use in the invention are (a) ester-containing byproducts from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

Other materials containing phthalic acid residues are polyalkylene terephthalates, especially polyethylene terephthalate (PET), residues or scraps. Still other residues are DMT process residues, which are waste or scrap residues from the manufacture of dimethyl terephthalate (DMT).

Polyoxyalkylene polyether polyols, which can be obtained by known methods, are preferred for use as the polyhydroxyl compounds. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and Encyclopedia Of Chemical Technology, Vol. 7, pp. 257–262, published by Interscience Publishers, Inc. (1951) or in U.S. Pat. No. 1,922,459.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4- hydroxyphenyl)-propane, commonly known as Bisphenol A.

Suitable organic amine initiators which may be condensed with alkylene oxides include aromatic amines such as aniline, N-alkylphenylene-diamines, 2,4'-, 2,2'-, and 4,4'-methylenedianiline, 2,6- or 2,4-toluenediamine, vicinal toluenediamines, o-chloro-aniline, paminoaniline, 1,5-diaminonaphthalene, methylene dianiline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, ethanolamine, diethanolamine, N-methyl- and N-ethylethanolamine, N-methyl- and N-ethyldiethanolamine, triethanolamine, triisopropanolamine, 1,3-diaminopropane, 1,3-diaminobutane, and 1,4-diaminobutane. Preferable amines include mono- and diethanolamine, vicinal toluenediamines, ethylenediamines, and propylenediamine. In a particularly preferred embodiment, at least one of the polyether polyols employed is initiated with an initiator containing or consisting of an aliphatic amine, and more preferably, all of the polyols used are initiated with an initiator containing an amine, most preferably an aliphatic amine. It is to be understood that the polyols initiated by an amine can also be initiated with a polyhydric alcohol, such as when a mixed initiator of an aliphatic amine/polyhydric alcohol is used like an amine/sucrose package.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Also suitable as the polyol are polymer modified polyols, in particular, the so-called graft polyols. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols are also preferred, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

As blowing agents, at least R-134a and water are employed. The amount of R-134a used will depend upon the desired foam density. For marine flotation applications, suitable free rise densities are greater than 1.7 pcf to 3.0 pcf, preferably 2.0 pcf to 2.5 pcf. To satisfy these density limitations, the amount of R-134a frothing agent is typically in the range of 5 pbw to 15 pbw, preferably from 7 pbw to 13 pbw, more preferably from 8 pbw to 11 pbw, based on 100 pbw of the polyol composition; or 3 weight percent to 7.5 weight percent, preferably at least 4 weight percent, and more preferably from 4.5 weight percent to 6.0 weight percent based on the weight of the froth foaming mixture. At amounts of less than 3 weight percent, the foamable mixture does not froth.

R-134a is particularly useful in this application because it produces a froth foaming mixture upon exposure to atmospheric pressures, and it remains trapped within the cell walls to maintain dimensional stability. Foams blown solely by carbon dioxide from the use of water tend to shrink due to the rapid migration of carbon dioxide out of the foam cells, rending the foam unsuitable as a buoyant device.

Water is employed as a co-blowing agent which reacts with the organic isocyanate to produce urea linkages and liberate carbon dioxide gas. In marine flotation devices where adhesion to a substrate and dimensional stability are important, the water level must be kept low to avoid surface friability which reduces adhesion and to avoid making the foam too brittle for this application. By using R-134a as a frothing agent, the amount of water can be reduced sufficiently to produce a foam which meets the U.S. Coast Guard requirements at the above-stated free rise densities. Thus, the amount of water is kept at 2.5 weight percent or less based on the weight of the polyol composition, and preferably 2.3 weight percent or less, more preferably 2.0 weight percent or less, based on the weight of the polyol composition. Based on the weight of the froth foaming mixture, the amount of water is 1.4 weight percent or less, preferably 1.15 weight percent or less, more preferably 1.0 weight percent or less.

The foam used as the positive flotation system is dimensionally stable, meaning that at 28 days at −20° F., 158° F., 100° F. and 100 percent relative humidity, and 158° F. at 100 percent relative humidity, a core sample taken from a 2'×4'×2" molded sample has a volume percent change of seven or less, preferably five or less, when employing a froth foaming mixture which would have a free rise density of 2.5 pcf or less.

The positive flotation foams also pass the U.S. Coast Guard immersion tests under 33 C.F.R. §183.114(a)–(h), which specify that no more than five percent of the buoyant force of the flotation material can be lost when immersed in various media. The foams used in the invention passed all the standards set out in (a) - (h), as measured by ASTM D-2842.

Catalysts may be employed which greatly accelerate the reaction of the compounds containing hydroxyl groups and with the modified or unmodified polyisocyanates. Examples of suitable compounds are cure catalysts which also function to shorten tack time, promote green strength, and prevent foam shrinkage. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X-R^1-Y]_2$, wherein R is a $C_1$-$C_8$ alkyl or aryl group, $R^1$ is a $C_0$-$C_{18}$ methylene group optionally substituted or branched with a $C_1$-$C_4$ alkyl group, Y is hydrogen or an hydroxyl group, preferably hydrogen, X is methylene, an -S-, an -$SR^2COO$-, -SOOC-, an -$O_3S$-, or an -OOC- group wherein $R^2$ is a $C_1$-$C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8C) tin (IV) salts of inorganic compounds such as butyltin trichloride, dimethyl- and diethyl- and dibutyl- and dioctyl- and diphenyl- tin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20C) tin dimercaptides, including dimethyl-, dibutyl-, and dioctyl- tin dimercaptides.

Tertiary amines also promote urethane linkage formation, and include triethylamine, 3-methoxypropyldimethylamine, triethylenediamine, tributylamine, dimethylcyclohexylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethylether, bis(-dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

In a preferred embodiment, a delayed action tertiary amine gel catalyst is employed to promote improved froth flow characteristics. Any of the above tertiary amines can be employed. Examples of suitable organic acid blocked amine gel catalysts are the acid blocked amines of triethylenediamine, N-ethyl or methyl morpholine, N,N dimethylaminoethyl morpholine, N-butylmorpholine, N,N' dimethylpiperazine, bis( dimethylamino-alkyl)-piperazines, 1,2 dimethyl imidazole, dimethyl benzylamine, tetramethylethylenediamine, and dimethyl cyclohexylamine. The blocking agent can be an organic carboxylic acid having 1 to 20 carbon atoms, preferably 1–2 carbon atoms. Examples of blocking agents include 2-ethyl-hexanoic acid and formic acid. Any stoichiometric ratio can be employed with one acid equivalent blocking one amine group equivalent being preferred. The tertiary amine salt of the organic carboxylic acid can be formed in situ, or it can be added to the polyol composition ingredients as a salt.

The polyol composition optionally contains a flame retardant. Examples of suitable phosphate flameproofing agents are tricresyl phosphate, tris(2-chloroethyl) phosphate, tris(2-chloropropyl) phosphate, and tris(2,3-dibromopropyl) phosphate. In addition to these halogen-substituted phosphates, it is also possible to use inorganic or organic flameproofing agents, such as red phosphorus, aluminum oxide hydrate, antimony trioxide, arsenic oxide, ammonium polyphosphate (Exolit ®) and calcium sulfate, molybdenum trioxide, ammonium molybdate, ammonium phosphate, pentabromodiphenyloxide, 2,3-dibromopropanol, hexabromocyclododecane, dibromoethyldibromocyclohexane, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 40 weight percent, preferably from 5 to 20 weight percent, of said flameproofing agents may be used based on the weight of the polyol composition.

Examples of suitable surfactants are compounds which serve to support homogenization of the starting materials and may also regulate the cell structure of the plastics. Specific examples are salts of sulfonic acids, e.g., alkali metal salts or ammonium salts of fatty acids such as oleic or stearic acid, of dodecylbenzene- or dinaphthylmethanedisulfonic acid, and ricinoleic acid; foam stabilizers, such as siloxaneoxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil, and cell regulators, such as paraffins, fatty alcohols, and dimethylpolysiloxanes. The surfactants are usually used in amounts of 0.01 to 5 wt. %, based on the weight of the polyol composition.

The organic polyisocyanates include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'- 2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, mixtures of 4,4'- and 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3.3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2',5,5'-tetraisocyanate and polymeric polyisocyanates such as polymethylene polyphenylene polyisocyanate, and mixtures thereof. Especially useful due to their availability and properties are 4,4'-diphenylmethane diisocyanate, polymethylene polyphenylene polyisocyanate, or mixtures thereof for rigid foams, or a mixture of the foregoing with toluene diisocyanates for semi-rigid foams.

Crude polyisocyanates may also be used in the compositions of the present invention, such as crude toluene diisocyanate obtained by the phosgenation of a mixture of toluenediamines or crude diphenylmethane isocyanate obtained by the phosgenation of crude diphenylmethane diamine. The preferred or crude isocyanates are disclosed in U.S. Pat. No. 3,215,652.

For pour-in-place applications, the rigid foam may be poured, sprayed or injected into the cavity of the watercraft hull or onto a watercraft substrate. Suitable substrate materials comprise metal such as aluminum, tin, or sheet metal; wood, including composite wood; fiberglass reinforced polyester, or any other substrate used for the manufacture of flotation devices and watercraft.

The polyurethane foam may be contiguous to and bonded to the inner surfaces of first and second substrates, or the polyurethane foam may be contiguous to a layer or lamina of synthetic material interposed between the substrates.

During the foam-in-place operation, the substrates may be fixed apart in a spaced relationship to define a cavity between the first substrate and second substrate, and optionally the inner surface of at least one substrate. This cavity is then filled with a froth foaming mixture which reacts and foams in situ.

The froth foaming mixtures can be dispensed from high pressure impingement mixing heads, low pressure foaming machines, but preferably on portable froth foaming equipment. The isocyanate compound stream and a formulated polyol composition stream, which is made up of a combination of liquid R-134a and the polyol composition, are ejected from a dispensing head in the form of a froth. While the isocyanate compound stream may be mixed with a formulated polyol composition stream at a wide range of weight ratios, an advantageous feature of the formulated polyol composition allows one to mix the two streams at a weight ratio of from 0.9:1 to 1.3:1 respectively, preferably at a 1.05:1 to 1.2:1 weight ratio, and at an isocyanate index ranging from 100 to 130, preferably at 105 to 120, while obtaining a foam having excellent dimensional stability at the densities mentioned above. Prior polyurethane foam formulations, however, were reacted at an iso/polyol weight ratio of from about 1.5:1 to 2:1 at isocyanate indices of 100 to 130, which required a larger amount of isocyanate to stoichiometrically react with the isocyanate reactive groups at equivalent isocyanate indices. Thus, the formulation of the invention and the method of dispensing allows one to manufacture a dimensionally stable foam using much smaller quantities of isocyanate.

In another feature of the invention, the froth foaming mixture can be dispensed at a constant flow regardless of pressure changes at the outlet of the dispensing head, thus obviating the need for using positive displacement flow control units or for metering the iso stream and polyol stream into the dispensing head at different flow rates. In this embodiment, the froth foaming mixture can be dispensed from a portable foaming apparatus as disclosed in U.S. Pat. Nos. 3,541,023 and 3,769,232, each of which is incorporated herein by reference. While the use of a static mixing device as the dispensing head is particularly preferred, the polyol composition along with the $C_2$-$C_6$ hydrofluorocarbon frothing agent can be employed in low pressure equipment having rotary mechanical mix dispensing heads or on high pressure equipment using impingement mix dispensing heads.

Typically, the portable foaming apparatus is comprised of at least two reactants supply tanks, a static mixer having inlets in communication with the supply tanks and an outlet for expelling the mixed reactants, means for imposing gas pressure to drive the reactants from the supply tanks, through and out of the static mixer, and flow control units for delivering the desired ratio of reactants, from their respective tanks, to the static mixer.

One of the supply tanks contains the organic isocyanate reactant or an organic isocyanate-terminated quasi-prepolymer or prepolymer. If desired, this tank may also contain an additive amount of a non-reactive fire-retardant material which may be used to impart flame retardant properties to the resulting foam. This tank may also contain R-134a and other non-reactive blowing agents in liquid form, but it is preferred to add all of the R-134a and other blowing agents to the formulated polyol composition supply tanks. The other polyurethane foam forming reactants may be supplied from one or more additional polyol composition supply tanks. Usually a single second tank is used to supply all these other reactants, i.e., polyol, foaming agent, catalyst, and surfactant, if such is used.

Any means for imposing pressure to drive the reactants from the supply tanks through and out of the static mixer may be used. Typically, a pressurized gaseous inert propellant, such as a nitrogen tank, is used having valved outlets communicating via suitable conduits with the inlets to the supply tanks. The supply tanks are kept under pressure to provide the driving force needed to propel the reactants from the supply tanks and to liquify the R-134a blowing agent in the formulated polyol compositions supply tank(s). The pressure in the supply tanks is generally 200–250 psig.

It is generally necessary, for the proper functioning of the portable foaming apparatus, that the viscosity of the contents of each of the supply tanks be no greater than about 1000 cps at 78° F. and more preferably no more than about 800 cps. This, of course, means that the materials in each tanks may have to be properly selected or formulated, as the case may be, in order to meet this viscosity requirement. The viscosity values mentioned herein are measured at 78° F. and at 80 psig. The viscosity of supply tanks contents are measured under a pressure of 80 psig because of the presence of R-134a in liquid form.

The portable foaming apparatus comprises a static mixer which is one containing no moving parts. Any such mixer which serves to adequately blend the reactants may be used. Illustrative of such a mixer is the one disclosed in U.S. Pat. No. 3,286,992.

By employing a portable foaming apparatus, the volume ratio of the isocyanate stream to the formulated polyol composition stream can be held at 1:1±0.1, or as pointed out above, at weight ratio in a preferable range of 1.05:1 to 1.2:1, thereby reducing the amount of isocyanate required to make a foam at a desired isocyanate index.

The isocyanate stream and the polyol composition stream are propelled by the inert gas under pressure into a dispensing head to form a foamable mixture which is ejected from the dispensing head through a static mixer dispensing head as a froth foaming mixture, which is a partially expanded foaming mixture much akin to the consistency of shaving cream, but which continues to expand on or in the application site to its full molded or free rise volume. The foamable mixture contains the liquid R-134a frothing agent, and preferably a formulated polyol composition is employed so that only two liquid streams enter the dispensing head.

The polyols employed in the working examples are defined as follows:

POLYOL A is a propylene oxide adduct of a sucrose/amine mixture having a nominal hydroxyl number of 350.

POLYOL B is a propylene oxide adduct of a sucrose/amine mixed initiator having a nominal hydroxyl number of 530.

POLYOL C is an amine initiated ethylene oxide adduct having a nominal hydroxyl number of 600.

NIAX L5440 is a silicone surfactant commercially available from OSI Specialties Inc.

DABCO 8154 is a 2-ethyl-hexanoic acid blocked triethylene diamine, commercially available from Air Products.

DABCO DC2 is a delayed action amine based catalyst available from Air Products.

EXAMPLE 1

The portable foaming apparatus referred to above was employed to prepare a frothed, rigid, molded polyurethane foam using the procedure and ingredients described herein. The particular foaming apparatus used was a BASF Autofroth ®SL-317 machine with a standard static mixer.

The foam forming ingredients were supplied from two cylindrical metal tanks. One supply tank contained the Iso A reactant, namely, polymethylene polyphenylene isocyanate. This material is commercially available under the trademark "AUTOFROTH® 9300A," a product of BASF Corporation, and has a viscosity at 25° C. of 200 cps. The other supply tank contained the following ingredients in Table 1 in the indicated relative proportions as weight percent.

TABLE 1

| INGREDIENTS | SAMPLE 1 WT. % | SAMPLE 2 WT. % | SAMPLE 3 WT. % |
|---|---|---|---|
| POLYOL A | 86 | 87.5 | 85 |
| POLYOL B | 2.4 | — | 2.4 |
| POLYOL C | 6.6 | 4.2 | 8.0 |
| WATER | 1.9 | 2.3 | 1.5 |
| DABCO 8154 | 0.1 | 2.0 | 0.1 |
| L-5440 | 3.0 | 3.0 | 3.0 |
| DABCO DC2 | — | 1.0 | — |
| TOTAL | 100 | 100 | 100 |
| % R-134a ADDED | 9 | 9 | 9 |
| WEIGHT RATIO ISO A/POLYOL | 100/89 | 100/89 | 100/89 |
| Average OH # | 372 | 361 | 375 |

Both of the two supply tanks were placed horizontally on a drum roller and rotated continuously for two hours at an approximate rate of 35 revolutions per minute. After the rotation was stopped, the inlets to the two supply tanks were connected to the nitrogen pressure tank and the pressure was increased to 240 psig. The tanks outlets were connected to the static mixer via separate conduits provided with flow control units. With the flow control units adjusted to deliver to the static mixer equal weight proportions from the first and second supply tanks, the foam forming ingredients were expelled, by means of the nitrogen head pressure, from their respective tanks, through the static mixer, and out into an aluminum mold preheated to 90° F. and having the dimensions 2'×4'×2". The results are reported below in Table 2.

TABLE 2

| PROPERTIES | SAMPLE 1 | SAMPLE 2 | SAMPLE 3 |
|---|---|---|---|
| DENSITY F.R. | 1.95 PCF | 2.2 PCF | 2.3 PCF |
| STRING GEL TIME | 2' 0" | 5" | 2' 0" |
| TACK FREE TIME | 3' 15" | 10" | 3' 15" |
| CHEMICAL TEMP. °F. | 85 | 120 | 85 |
| % CLOSED CELL | 92 | 91 | 92 |
| CORE DENSITY OF 2' × 4' × 2" PANEL | 2.6 | — | 2.9 |
| % VOLUME CHANGE AT 28 DAYS | | | |
| −20° F. | −1 | 1 | 1 |
| 158° F. | −2 | 0 | −1 |
| 200° F. | 4 | — | 4 |
| 100° F./100% R.H. | 2 | 3 | 2 |
| 158° F./100% R.H. | 3 | 4 | 3 |
| CGD 75-168 (§183.114(a)-(h)) | PASS | PASS | PASS |

The results above indicate that the low density foams using low amounts of water were dimensionally stable and are useful as positive flotation materials as demonstrated by their passing status under CGD 75-168.

What I claim is:

1. A formulated polyol composition comprising 1,1,1,2-tetrafluoroethane combined with a polyol composition comprising:
   a) compounds having at least two isocyanate active hydrogens, said compounds having an average hydroxyl number of less than 400 and an average functionality of greater than 4.0;
   b) water; and,
   c) a catalyst;
   wherein the formulated polyol composition is under a pressure sufficient to keep 1,1,1,2-tetrafluoroethane in a liquid state.

2. The composition of claim 1, wherein the a) compounds have an average hydroxyl number of 350 or less and a functionality of 4.5 or more.

3. The composition of claim 1, wherein the amount of water is 2.5 weight percent or less based on the weight of the polyol composition.

4. The composition of claim 1, wherein the amount of 1,1,1,2-tetrafluoroethane is 5 pbw to 15 pbw based on 100 pbw of the polyol composition.

5. The composition of claim 1, wherein the viscosity of the formulated polyol composition is 800 cps or less when measured at 78° F. and 80 p.s.i.g., and the amount of 1,1,1,2-tetrafluoroethane is 7 pbw to 13 pbw based on 100 pbw of the polyol composition.

* * * * *

Dedication 5,449,699 — Todd J. Green, Canton, Mich. RIGID CLOSED CELL POLYISOCYANATE BASED FOAMS FOR USE AS POSITIVE FLOTATION MATERIALS IN WATERCRAFT. Patent dated September 12, 1995. Dedication filed August 23, 2000, by the assignee, BASF Corporation.

Hereby dedicates to the public the entire term of said patent.
*(Official Gazette, November 21, 2000)*